United States Patent [19]
Ho

[11] Patent Number: 5,259,626
[45] Date of Patent: Nov. 9, 1993

[54] PROGRAMMABLE VIDEO GAME CONTROLLER

[75] Inventor: Patrick T. Ho, Kwai Chung, Hong Kong

[73] Assignee: STD Electronic International Ltd., Hong Kong, Hong Kong

[21] Appl. No.: 925,738

[22] Filed: Aug. 7, 1992

[51] Int. Cl.⁵ .................. A63F 9/24; G06F 3/037
[52] U.S. Cl. .................. 273/438; 273/148 B; 345/157
[58] Field of Search .................. 273/148 B, DIG. 28, 273/433, 434, 438, 85 G; 340/706, 709

[56] References Cited

U.S. PATENT DOCUMENTS

| | | | |
|---|---|---|---|
| 4,342,454 | 8/1982 | Baer et al. | 273/85 G |
| 4,976,435 | 12/1990 | Shatford et al. | 273/148 B |

FOREIGN PATENT DOCUMENTS 0163411  12/1981  Japan ................ 340/709

*Primary Examiner*—Jessica J. Harrison
*Attorney, Agent, or Firm*—Burns, Doane, Swecker & Mathis

[57] ABSTRACT

A controller for video games includes a mechanism for recording, storing and retrieving a sequence of instructions. When playing a relatively complex game involving a relatively complex sequence of instructions which are used repetitively, these instructions need be entered only once and can be retrieved as required.

2 Claims, 4 Drawing Sheets

|  | U P | D O W N | L E F T | R I G H T | A | B | X | Y | L | R | DURATION | |
|---|---|---|---|---|---|---|---|---|---|---|---|---|
| STEP 1 | 0 | 1 | 1 | 0 | 0 | 0 | 0 | 0 | 0 | 0 | 00010100 | 20/60 SEC |
| STEP 2 | 0 | 0 | 1 | 0 | 0 | 0 | 0 | 0 | 0 | 0 | 00001011 | 10/60 SEC |
| STEP 3 | 0 | 0 | 0 | 0 | 0 | 0 | 0 | 0 | 0 | 0 | 00001011 | 10/60 SEC |
| STEP 4 | 1 | 0 | 0 | 1 | 1 | 0 | 0 | 0 | 0 | 0 | 00001101 | 13/60 SEC |
| STEP 5 | 0 | 0 | 0 | 0 | 1 | 0 | 0 | 0 | 0 | 0 | 00000110 | 6/60 SEC |
| STEP 6 | 0 | 0 | 1 | 0 | 1 | 0 | 0 | 0 | 0 | 0 | 00010100 | 20/60 SEC |
| STEP 7 | 0 | 0 | 1 | 0 | 1 | 0 | 1 | 0 | 1 | 1 | 00010001 | 17/60 SEC |
| STEP 8 | 0 | 0 | 0 | 0 | 1 | 0 | 0 | 0 | 1 | 1 | 00001101 | 13/60 SEC |

Fig. 4

PROGRAMMABLE VIDEO GAME CONTROLLER

FIELD OF THE INVENTION

The present invention relates to home video games, and in particular relates to a video game control mechanism.

BACKGROUND OF THE INVENTION

A typical home video game system comprises a home television on which the progress of the game, for example a war game, is viewed; a console connected to the television for receiving the cassette tape or disc on which the particular game is stored; and a joystick, joypad or controller connected to the console and including various switches or other manually operable controls for playing the game. A typical controller includes four directional switches (UP, DOWN, LEFT, RIGHT) for moving a playing piece, for example a tank or aircraft, and a number of firing switches for operating the weapons of the playing piece, for example for firing particular guns or dropping bombs.

In a simple war game a player has one playing piece available to him with a limited number of movements and provided with a limited number of weapons. To make a particular movement or to fire a particular movement, all that is required is that one directional switch or firing switch be operated.

However, in a more complex game, a player has a larger range of playing pieces, movements, and actions available to him. For a specific playing piece to make a specific movement or carry out a specific action it is necessary for the player to operate a number of controls, each for a particular period of time, and in a particular sequence. Players who wish to play and enjoy the more complex game may be deterred from doing so because they are not sufficiently expert in the use of the controller. Even for players who are expert in the use of the controller it may be tedious to repetitively perform a complex sequence where the same playing piece is to perform the same movement or the same action repetitively.

OBJECT AND SUMMARY OF THE INVENTION

An object of the present invention is to provide a controller which allows a more complex game to be played more easily than with a conventional controller.

The invention provides a controller including recording means for making a record of commands entered by a player, storage means for storing the record, and retrieval means for retrieving the record.

Using the controller according to the invention a complex series of commands may be entered once and need not subsequently be re-entered, but instead may be retrieved for future use. A player who is expert in using a controller may record a complex sequence for his own future use and convenience, or for use by a player who is less expert.

A preferred construction of controller comprises directional switches, firing switches, detection means for detecting the closure and the duration of closure of the directional and firing switches, conversion means for converting the results of the detection into digital format data, storage means for storing the digital data, and retrieval means for retrieving the digital data, whereby a complex sequence of instructions may be detected, converted into digital format, stored in digital format, and retrieved when required so as to avoid the necessity of re-entering the complex sequence of commands.

BRIEF DESCRIPTION OF THE DRAWINGS

FIG. 4 is an example of a sequence of commands stored in memory.

DETAILED DESCRIPTION OF PREFERRED EMBODIMENT

Figure 1:
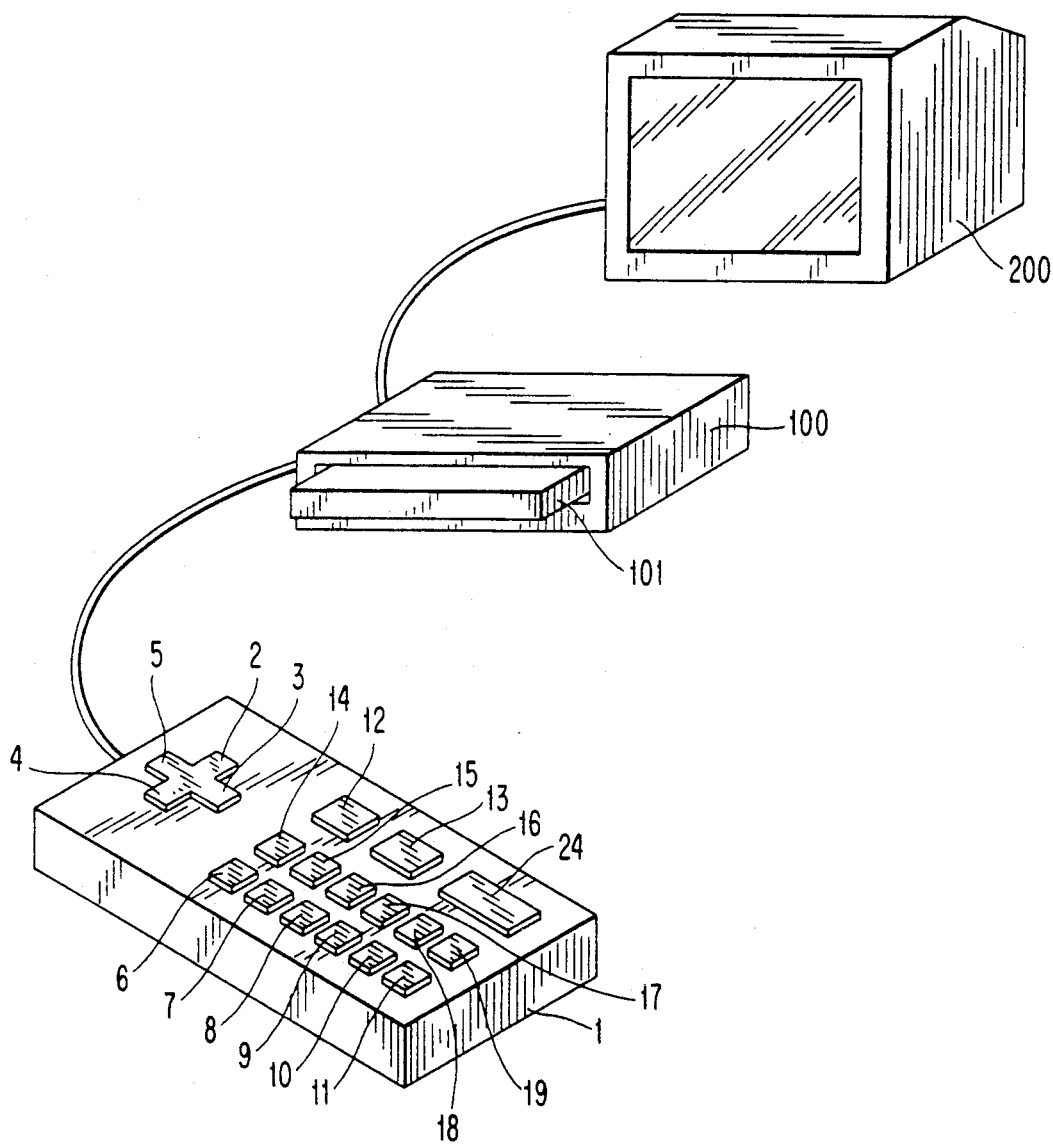
FIG. 1 is a perspective view of a video game system including a controller in accordance with the invention.

Referring initially to FIG. 1, the drawing shows a controller 1, a console 100 and cassette tape 101 and a television 200.

The controller 1 includes four directional switches 2, 3, 4 and 5; six firing switches 6, 7, 8, 9, 10 and 11; a setting switch 12 for playing in the normal mode (non-recording mode), a setting switch 13 for playing in the recording mode; and six action play back switches 14, 15, 16, 17, 18 and 19.

In normal use of the controller, when playing a simple game, the player operates the directional switches 2, 3, 4, 5 to move the playing piece, and operates the firing switches 6, 7, 8, 9, 1 0, 1 1 to fire the weapons.

In normal use of the controller, when playing a more complex game, where the player has multiple playing pieces, capable of multiple movements, and capable of multiple actions, then in order to cause a specific playing piece to make a specific movement and carry out a specific action, the player must enter a complex sequence of commands by operating the directional switches 2, 3, 4, 5 and the firing switches 6, 7, 8, 9, 10, 11 in a particular sequence and particular combination for particular lengths of time.

In accordance with the invention, immediately before performing the complex sequence, the player may depress the "RECORD" button 13. Thereafter as the player performs the complex sequence, this sequence is recorded. Upon completion of the sequence the player presses the "NORMAL" button 12 to discontinue recording. If at a later stage the player wishes to perform the same sequence, then all that is necessary is that the player presses the first "ACTION PLAY BACK" button 14. As further sequences are entered, these may be retrieved by pressing the second and subsequent "ACTION PLAY BACK" buttons 15, 16, 17, 18, 19.

Figure 2:
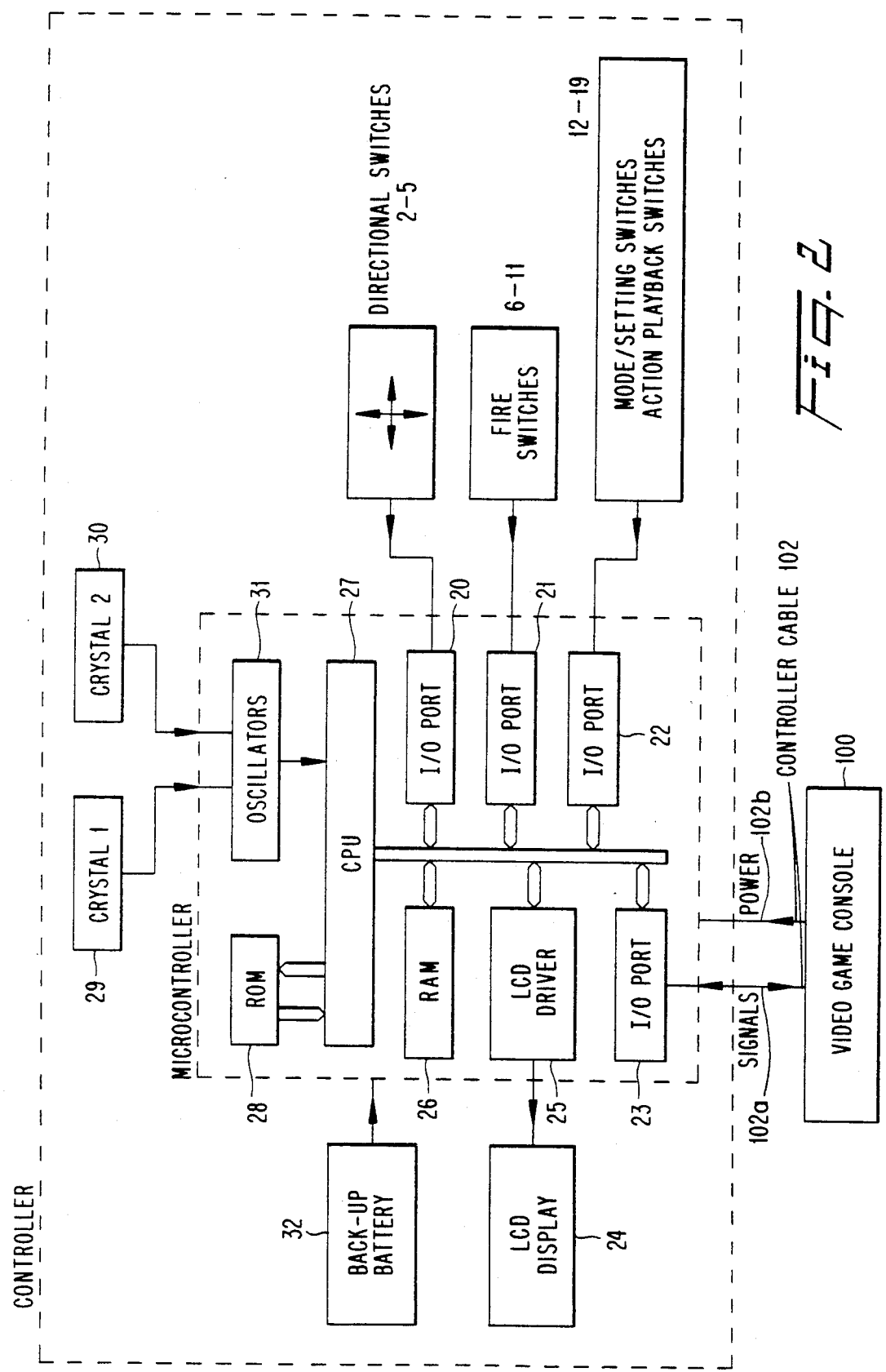
FIG. 2 is a circuit diagram of the controller.

Referring now to FIG. 2, the controller comprises directional switches 2, 3, 4 and 5, firing switches 6, 7, 8, 9, 1 0 and 11, mode setting switches 12, 13 and action play back switches 14, 15, 16, 17, 18, 19, input/output ports 20, 21, 22 associated with the various switches, an input/output port 23 for transmitting signals between the controller 1 and the video game console 100, a liquid crystal display 24, a liquid crystal display driver 25, a random access memory 26, a central processing unit 27, a read only memory 28, a first crystal 29, a second crystal 30, oscillators 31, and a back up battery 32. The drawing also shows the video game console 100, and a cable 102 between the controller and the video game console, the cable 102 including a signal cable 102a for transmitting signals between the controller 1 and the console 100, and including a power cable 102b for receiving power from the video game console 100 so as to drive the controller 1.

In use, the controller 1 is connected by means of the cable 102 to the video game console 100. As a result, the controller 1 receives a power supply and is activated in the manner of a conventional video game controller. A video game may then be played in the normal manner by operating the directional switches 2, 3, 4, or 5 and the fire switches 6, 7, 8, 9, 10 and 11.

In accordance with the invention the player may depress the "RECORD" button 13, and when the player does this the sequence of instructions subsequently entered on the directional switches 2, 3, 4 and 5 and fire switches 6, 7, 8, 9, 10 and 11 is converted by the central processing unit 27 in accordance with a program stored in the read only memory 28 into the form of digital data which is then stored in the random access memory 26. When the sequence is complete, the user then presses the "NORMAL" button 12 and may then continue playing in the normal manner. The central processing unit 27 sends a signal to the liquid crystal display driver 25 and from there to the liquid crystal display 24 which indicates that a sequence of instructions has been stored corresponding to a particular "ACTION PLAY BACK" switch 14, 15, 16, 17, 18 or 19. Further sequences of instructions may be entered in the same manner. In playing the game, if it is desired to repeat one of the sequences, the player presses the appropriate "ACTION PLAY BACK" button 14, 15, 16, 17, 18 or 19 and the controller 1 then retrieves the appropriate sequence from memory, encodes the sequence, and transmits the encoded sequence to the console 100.

The controller 1 is provided with a back up battery 32 for maintaining a power supply to the random access memory 26 when the controller 1 has been disconnected from the video game console 100. As a result it is not necessary to re-enter the sequences of instructions every time the controller 1 is disconnected and reconnected. Instead the sequences may be retained until the player chooses to erase them. To minimize power consumption in the back up mode, the central processing unit operates under the control of crystal 30 which is relatively slow instead of crystal 29 which is much faster.

Figure 3:
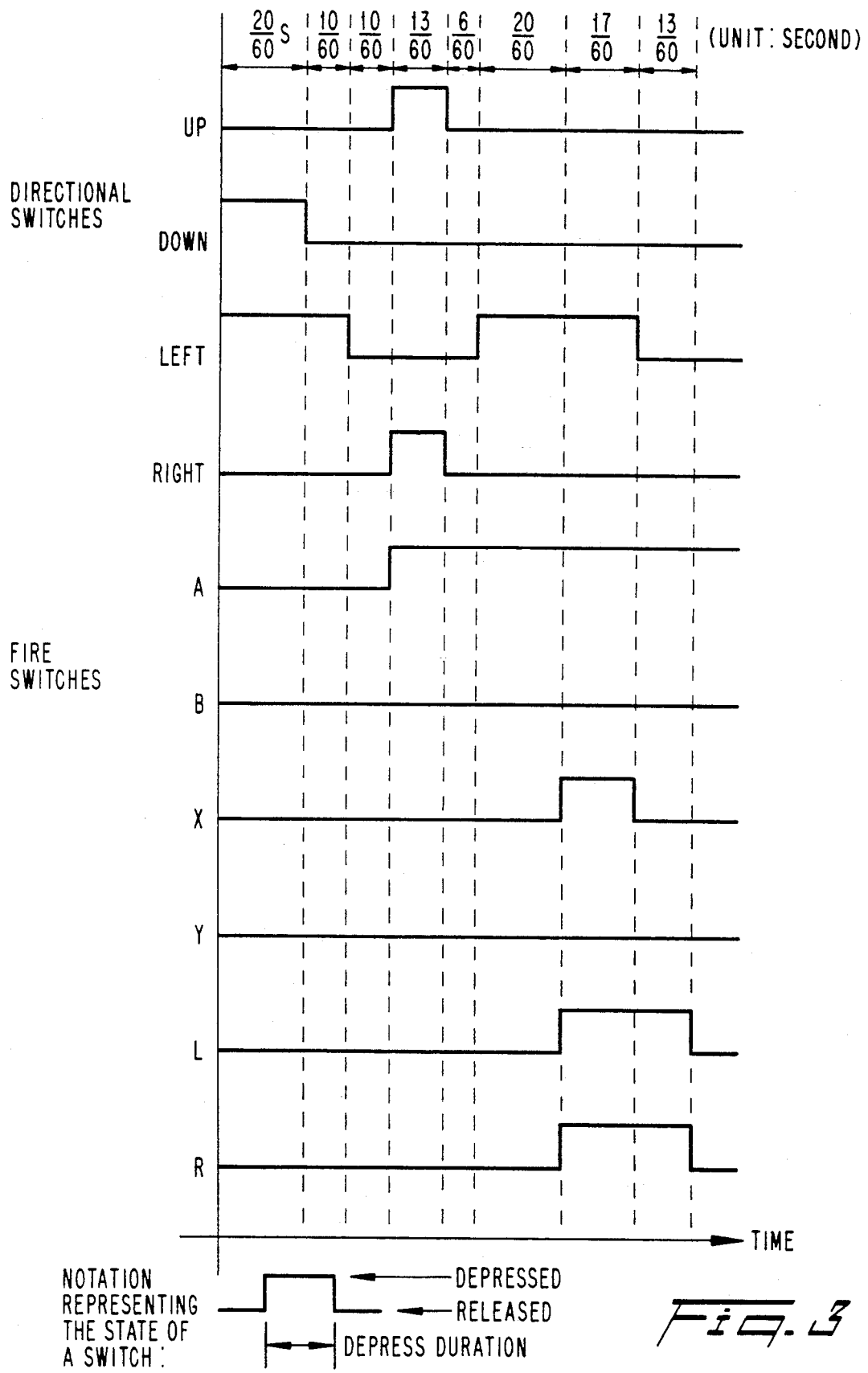
FIG. 3 is a key and timing diagram of a sequence of commands.

FIG. 3 is an example of a sequence which may be stored. The figure is a graph of the state (depressed or not depressed) of each of the four directional switches 2, 3, 4 and 5 and six firing switches 6, 7, 8, 9, 10 and 11 plotted against time. It will be noted that the switches are depressed in a complex sequence for different durations of time and in different combinations. As may also be seen the basic unit of time is one sixtieth of a second.

FIG. 4 shows the data of FIG. 3 entered in random access memory 26.

To best understand FIGS. 3 and 4 and their relationship, the "UP" switch 2 should be considered. As will be seen in the top graph in FIG. 3, the "UP" 2 switch is a straight line except for one square wave form. This square wave form represents the time during which the switch 2 is depressed, and it will be seen that depression starts after forty sixtieths of a second, continues for thirteen sixtieths of a second, and is then discontinued. Turning now to FIG. 4, and considering the array of "0"s and "1"s, and in particular looking down the left hand column beneath "UP", it will be seen that the "UP" switch 2 is in the zero (non-depressed) state all down the column except at Step 4. Now looking across the row marked Step 4 it will be seen that the "UP" switch 2 has been depressed at the same time as the "RIGHT" switch 3 and the same time as the "A" fire switch 6, and it will be seen that the duration is thirteen sixtieths of a second which is expressed as "1101" in binary notation. Looking at FIGS. 3 and 4 together, it will be seen that the complex sequence of switching has been reduced into eight different steps, each step involves certain switches being depressed and others not depressed, and each step lasts for a particular time, and these steps are shown in FIG. 3 as the intervals between the vertical dashed lines, and in FIG. 4 as the sequence of "1"s and "0"s reading from left to right across the array.

The liquid crystal display 24 shows all necessary data including mode/setting, memory allocation of stored instructions, and the state (depressed/not depressed) of the directional, firing and playback switches.

I claim:

1. A video game controller including recording means selectively operable by a player for making a record of a sequence of commands entered by the player, storage means for storing a plurality of such records, and retrieval means selectively operable by the player for instantaneously retrieving a selected one of the plurality of records from the storage means and for using the sequence of commands in the selected record during the course of playing a game.

2. A controller according to claim 1 further comprising directional switches, firing switches, detection means for detecting the closure and the duration of closure of the directional and firing switches, and conversion means for converting the results of the detection into digital format data, and wherein said storage means stores the digital data as one of said records, and said retrieval means retrieves the digital data, whereby a complex sequence of instructions may be detected, converted into digital format, stored in digital format, and retrieved when said retrieval means is operated by the player.

* * * * *